(12) United States Patent
Choi et al.

(10) Patent No.: US 11,578,273 B1
(45) Date of Patent: Feb. 14, 2023

(54) UPGRADING OF HEAVY RESIDUES BY DISTILLATION AND SUPERCRITICAL WATER TREATMENT

(71) Applicant: Saudi Arabian Oil Company, Dhahran (SA)

(72) Inventors: Ki-Hyouk Choi, Dhahran (SA); Young-Kyoung Ahn, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/671,776

(22) Filed: Feb. 15, 2022

(51) Int. Cl.
*C10G 7/06* (2006.01)
*B01J 3/00* (2006.01)
(Continued)

(52) U.S. Cl.
CPC ............... *C10G 7/06* (2013.01); *B01D 3/10* (2013.01); *B01D 3/106* (2013.01); *B01D 3/40* (2013.01); *B01D 19/0036* (2013.01); *B01J 3/008* (2013.01); *C10G 2300/107* (2013.01); *C10G 2300/1074* (2013.01);
(Continued)

(58) Field of Classification Search
CPC ............... C10G 7/06; C10G 2300/107; C10G 2300/1074; C10G 2300/202; C10G 2300/301; C10G 2300/308; C10G 2300/408; B01D 3/10; B01D 3/106; B01D 3/40; B01D 19/0036; B01J 3/008
See application file for complete search history.

(56) References Cited

U.S. PATENT DOCUMENTS 3,623,974 A 11/1971 Mounce
4,698,146 A 10/1987 Gruia
(Continued)

FOREIGN PATENT DOCUMENTS

KR 20150142523 A 12/2015
WO 2013000067 A1 1/2013

OTHER PUBLICATIONS

Baldwin et al., "Coal liquefaction catalysis: Iron pyrite and hydrogen sulphide", Fuel, vol. 62, 1983, pp. 498-501.
(Continued)

*Primary Examiner* — Randy Boyer
*Assistant Examiner* — Juan C Valencia
(74) *Attorney, Agent, or Firm* — Bracewell LLP; Constance G. Rhebergen; Eleanor L. Tyson (57) ABSTRACT

A method of upgrading an overflash stream from a vacuum distillation unit comprising the steps of separating the overflash stream from an atmospheric residue stream, the overflash stream comprises an overflash fraction having a T10% between 475 and 530° C. and a T90% between 600 and 700° C.; introducing the reactor feed to a supercritical reactor at a temperature between 380° C. and 500° C. and a pressure between 25 MPa and 30 MPa; maintaining upgrading reactions in the supercritical reactor to upgrade the overflash fraction such that a reactor effluent comprises upgraded hydrocarbons relative to the overflash fraction; reducing a temperature of a reactor effluent in a cooling device to produce a cooled stream; reducing a pressure of the cooled stream in a depressurizing device to produce a discharged stream; and separating the discharged stream in a gas-liquid separator to produce a liquid phase product.

18 Claims, 6 Drawing Sheets

(51) Int. Cl.
  *B01D 3/10*   (2006.01)
  *B01D 3/40*   (2006.01)
  *B01D 19/00*  (2006.01)

(52) U.S. Cl.
  CPC . *C10G 2300/202* (2013.01); *C10G 2300/301* (2013.01); *C10G 2300/308* (2013.01); *C10G 2300/4081* (2013.01)

(56) References Cited

U.S. PATENT DOCUMENTS

| | | |
|---|---|---|
| 6,280,606 B1 | 8/2001 | Morel et al. |
| 7,718,050 B2 | 5/2010 | Gueret et al. |
| 9,452,955 B2 | 9/2016 | Sieli et al. |
| 9,879,188 B2 | 1/2018 | Koseoglu |
| 10,066,172 B2 | 9/2018 | Choi et al. |
| 10,336,953 B2 | 7/2019 | Chatron-Michaud et al. |
| 10,344,225 B2 | 7/2019 | Mukherjee et al. |
| 10,703,999 B2 | 7/2020 | Choi et al. |
| 11,001,766 B2 | 5/2021 | Choi et al. |
| 11,149,213 B2 | 10/2021 | Choi et al. |
| 2017/0166822 A1* | 6/2017 | Choi ............... C10G 49/18 |
| 2018/0258353 A1* | 9/2018 | Choi ............... C10G 31/08 |

OTHER PUBLICATIONS

Espacenet English Translation of KR20150142523, published Dec. 22, 2015, 1 page.

Gudiyella, Soumya et al., "Modeling Study of Vacuum Residue Upgrading in Supercritical Water", MIT, AIChE Journal, Feb. 2018, 46 pages.

Raghavan, Ashwin et al.; "Simulation of supercritical water-hydrocarbon mixing in a cylindrical tee at intermediate Reynolds number: Impact of temperature difference between streams" The Journal of Supercritical Fluids 95 (2014) pp. 325-338.

* cited by examiner

FIG. 1

(Prior Art)

FIG. 2

(Prior Art)

UPGRADING OF HEAVY RESIDUES BY DISTILLATION AND SUPERCRITICAL WATER TREATMENT

TECHNICAL FIELD

Disclosed are methods for upgrading bottom of barrel streams. Specifically, disclosed are methods and systems for upgrading an overflash stream in a supercritical water process.

BACKGROUND

Figure 1:
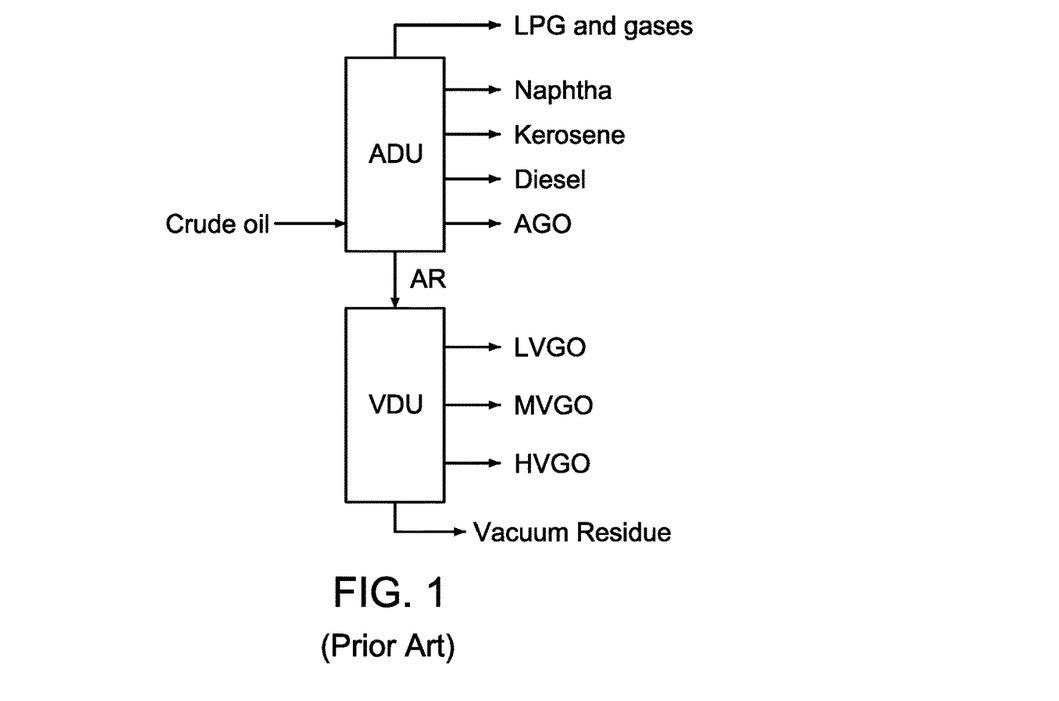
FIG. 1 provides a process diagram of a prior art atmospheric distillation unit and vacuum distillation unit.

FIG. 1 shows a conventional distillation scheme for a petroleum refinery. A whole range crude oil is fractionated into liquid petroleum gas (LPG) and gases, kerosene, naphtha, diesel, atmospheric gas oil (AGO), and atmospheric residue (AR) by an atmospheric distillation unit (ADU) or crude distillation unit (CDU) which is operated at pressure elevated slightly above atmospheric pressure, in the range of 0.5-2 barg. The number of cut streams and boiling point range of each stream from the ADU varies based on the needs of the refinery. AR is a valuable stream that can be used as the feed for a conversion unit, such as desulfurization and catalytic cracking. However, the bottom fraction of AR gives many challenges in adding value by conventional refining processes due to its heaviness and high concentration of impurities, such as metals and asphaltenes.

Figure 2:
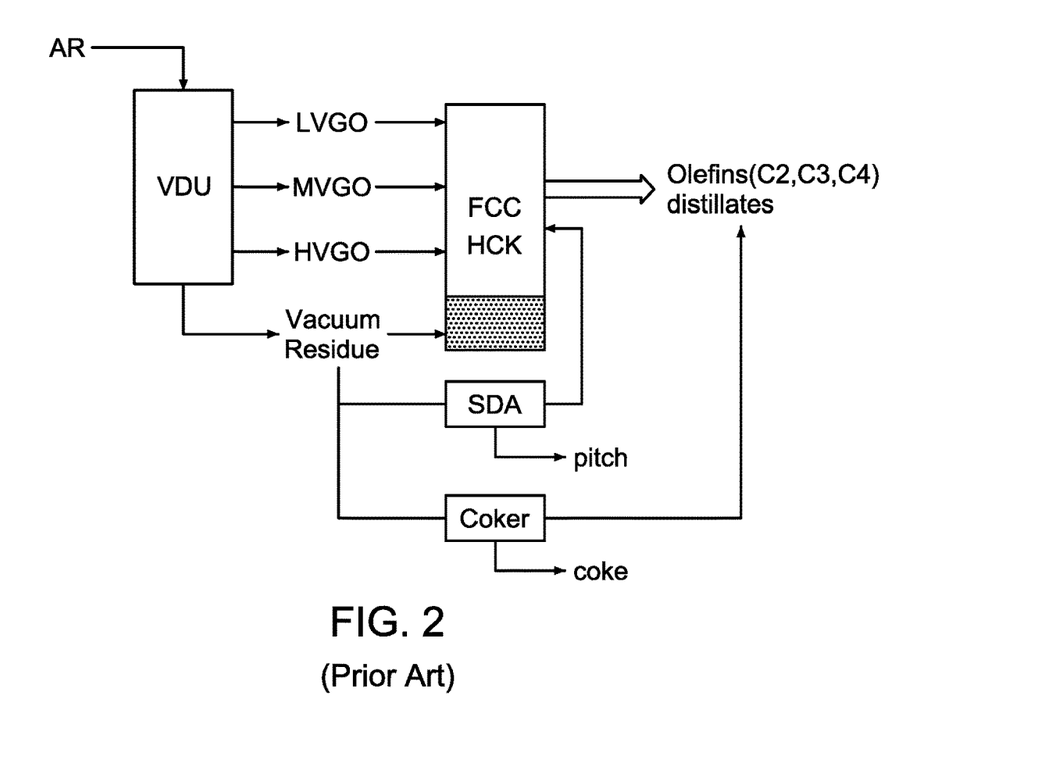
FIG. 2 provides a process diagram of a prior art vacuum distillation unit and product streams.

Thus, it is common practice to fractionate AR into vacuum gas oils and vacuum residue by a vacuum distillation unit (VDU) which is operated under vacuum, 10 to 50 milliBara (7.5-37 milliTorr). Vacuum gas oils, light, medium and heavy VGOs, are valuable feedstocks for hydrocracking, catalytic cracking (FCC), and other conversion processes to produce fuels, such as gasoline and diesel, as well as chemicals, for example, propylene. The rejected stream, vacuum residue (VR), is difficult to convert to other hydrocarbons due to its heaviness and high concentration of impurities. Thus, VR is processed separately as shown in FIG. 2. Solvent deasphalting (SDA) process can process VR and produce cleaner deasphalted oil (DAO), but in the process rejects a certain fraction of the concentrated dirty materials as pitch. DAO is a suitable feed for a conventional conversion process such as hydrocracking (HCK) and FCC. However, DAO yield from SDA is in the range of 30-70 vol %, meaning a substantial portion of VR is rejected to pitch, which has much lower value than other products.

As an alternative process, coker processes have long been utilized. Coker processes, where neither catalyst nor hydrogen are supplied, produce large amounts of solid coke and relatively smaller amounts of liquid products that can be mixed with other distillates or processed through conventional conversion processes.

Due to wide price differential between products from conversion processes and pitch/coke, refineries want to reduce VR quantity by adjusting VDU operating conditions such as increasing cut point of VR which allows greater amount of VGO. However, such a "deep-cut" VGO has an increased concentration of impurities relative to a "shallow-cut" VGO, making it more difficult to process through conventional conversion processes. More narrower cuts from VDU for harvesting more VGO range hydrocarbons may also be considered. For example, VDU may be designed and operated to produce heavy-heavy VGO (HHVGO), heavy VGO (HVGO), light-heavy VGO (LHVGO), heavy-middle VGO (HMVGO) and so on. However, many side draws require an increase of capital cost and difficulty in operation. Thus, it is not desired solution

SUMMARY

Disclosed are methods for upgrading bottom of barrel streams. Specifically, disclosed are methods and systems for upgrading an overflash stream in a supercritical water process.

In a first aspect, a method of upgrading an overflash stream from a vacuum distillation unit is provided. The method includes the steps of separating the overflash stream from an atmospheric residue stream in the vacuum distillation unit, where the overflash stream includes an overflash fraction having a T10% between 475 and 530° C. and a T90% between 600 and 700° C., increasing a pressure of an overflash stream in an oil pump to produce a pressurized overflash stream, reducing a temperature of the pressurized overflash stream in a precooler to produce a cooled overflash stream, where the temperature of cooled overflash stream is in the range between 150° C. and 350° C., increasing a pressure of a water stream in a water pump to produce a pressurized water stream, increasing a temperature of the pressurized water stream in a water preheater to produce a supercritical water stream, where a pressure of the supercritical water stream is between 23 MPa and 30 MPa and a temperature of the supercritical water stream is between 400° C. and 600° C., and mixing the supercritical water stream and the cooled overflash stream in a mixer to produce a reactor feed. The method further includes the steps of introducing the reactor feed to a supercritical reactor, where the supercritical reactor is in the absence of an external supply of hydrogen, where the supercritical reactor is in the absence of an external supply of catalyst, where the supercritical reactor is at a temperature between 380° C. and 500° C. and a pressure between 25 MPa and 30 MPa, maintaining upgrading reactions in the supercritical reactor to upgrade the overflash fraction in the reactor feed, such that a reactor effluent produced by the supercritical reactor includes upgraded hydrocarbons relative to the hydrocarbons in the overflash fraction, reducing a temperature of a reactor effluent in a cooling device to produce a cooled stream, reducing a pressure of the cooled stream in a depressurizing device to produce a discharged stream, and separating the discharged stream in a gas-liquid separator to produce a gas product and a liquid phase product.

In certain aspects, the method further includes the steps of transferring the liquid phase product in a transfer pump to produce a recycle stream, mixing the recycle stream and the atmospheric residue stream in a feed mixer to produce a mixed feed, increasing a temperature of the mixed feed in a feed heater to produce a heated feed, and introducing the heated feed to the vacuum distillation unit, where water in the liquid phase product provides stripping steam in the vacuum distillation unit. In certain aspects, the method further includes the steps of transferring the liquid phase product in a transfer pump to produce a recycle stream, and mixing the recycle stream and a heated atmospheric residue in a feed mixer to produce a hot mixed feed, where water in the liquid phase product provides stripping steam in the vacuum distillation unit. In certain aspects, the method further includes the steps of splitting the liquid phase product into a liquid phase stream and a liquid phase discharge, and transferring the liquid phase stream in a transfer pump to produce a recycle stream. In certain aspects, the gas-liquid separator is a flash column and the method further includes the steps of separating the discharged stream in the flash column to produce a vapor product and a liquid recycle stream, where a temperature in the flash column is between 120° C. and 300° C. and a pressure is between 0.1 barg and 20 barg such that the pressure is selected to be equal to or less than the steam saturation pressure at the temperature in the flash column, where the vapor product includes greater than 50 wt % of the amount of water in the discharged stream, and transferring the liquid recycle stream in a transfer pump to produce a recycle stream. In certain aspects, a mass flow ratio of the water stream to the overflash stream is in the range of 10:1 and 0.1:1 wt/wt at SATP. In certain aspects, the supercritical reactor includes one or more tubular reactors oriented horizontally, vertically, on an incline, on a decline, or as a combination of the same. In certain aspects, a residence time in the supercritical reactor 112 is in the range of 0.5 minutes and 30 minutes. In certain aspects, a Reynolds number of the internal fluid in supercritical reactor is greater than 5,000. In certain aspects, a temperature of the cooled stream is between 150° C. and 350° C. In certain aspects, a pressure of the discharged stream is between ambient pressure and 0.5 MPa. In certain aspects, the system further includes the step of separating the liquid phase product in an oil-water separator to produce a liquid oil product and a water product.

In a second aspect, a system to upgrade an overflash stream from a vacuum distillation unit is provided. The system includes the vacuum distillation unit configured to separate the overflash stream from an atmospheric residue stream, where the overflash stream includes an overflash fraction having a T10% between 475 and 530° C. and a T90% between 600 and 700° C., an oil pump fluidly connected to the vacuum distillation unit, the oil pump configured to increase a pressure of the overflash stream produce a pressurized overflash stream, a precooler fluidly connected to the oil pump, the precooler configured to reduce a temperature of the pressurized overflash stream to produce a cooled overflash stream, a water pump configured to increase a pressure of a water stream to produce a pressurized water stream, a water preheater fluidly connected to the water pump, the water preheater configured to reduce a temperature of the pressurized water stream to produce a supercritical water stream, and a mixer fluidly connected to the precooler and the water preheater, the mixer configured to mix the supercritical water stream and the cooled overflash stream to produce a reactor feed. The system further includes a supercritical reactor fluidly connected to the mixer, the supercritical reactor configured to maintain upgrading reactions to upgrade the overflash fraction in the reactor feed to produce a reactor effluent, where the supercritical reactor is in the absence of an external supply of hydrogen, where the supercritical reactor is in the absence of an external supply of catalyst, where the supercritical reactor is at a temperature between 380° C. and 500° C. and a pressure between 25 MPa and 30 MPa, a cooling device fluidly connected to the supercritical reactor, the cooling device configured to reduce a temperature of the reactor effluent to produce a cooled stream, a depressurizing device fluidly connected to the cooling device, the depressurizing device configured to reduce a pressure of the cooled stream to produce a discharged stream, and a gas-liquid separator fluidly connected to the depressurizing device, the gas-liquid separator configured to separate the discharged stream to produce a gas product and a liquid phase product.

In certain aspects, the system further includes a transfer pump fluidly connected to the gas-liquid separator, the transfer pump configured to transfer the liquid phase product to produce a recycle stream, a feed mixer fluidly connected to the transfer pump, the feed mixer configured to mix the recycle stream and the atmospheric residue stream to produce a mixed feed, and a feed heater fluidly connected to the feed mixer, the feed heater configured to increase a temperature of the mixed feed to produce a heated feed, where the heated feed is introduced the vacuum distillation unit. In certain aspects, the system further includes a transfer pump fluidly connected to the gas-liquid separator, the transfer pump configured to transfer the liquid phase product to produce a recycle stream, and a feed mixer fluidly connected to the transfer pump, the feed mixer configured to mix the recycle stream and a heated atmospheric residue to produce a hot mixed feed, where water in the liquid phase product provides stripping steam in the vacuum distillation unit. In certain aspects, the gas-liquid separator is a flash column, where a temperature in the flash column is between 120° C. and 300° C. and a pressure is between 0.1 barg and 20 barg such that the pressure is selected to be equal to or less than the steam saturation pressure at the temperature in the flash column, where the vapor product includes greater than 50 wt % of the amount of water in the discharged stream. In certain aspects, the system further includes an oil-water separator fluidly connected to the gas-liquid separator, the oil-water separator configured to separate the liquid phase product to produce a liquid oil product and a water product.

BRIEF DESCRIPTION OF THE DRAWINGS

These and other features, aspects, and advantages of the scope will become better understood with regard to the following descriptions, claims, and accompanying drawings. It is to be noted, however, that the drawings illustrate only several embodiments and are therefore not to be considered limiting of the scope as it can admit to other equally effective embodiments.

In the accompanying Figures, similar components or features, or both, may have a similar reference label.

DETAILED DESCRIPTION

While the scope of the apparatus and method will be described with several embodiments, it is understood that one of ordinary skill in the relevant art will appreciate that many examples, variations and alterations to the apparatus and methods described here are within the scope and spirit of the embodiments.

Accordingly, the embodiments described are set forth without any loss of generality, and without imposing limitations, on the embodiments. Those of skill in the art understand that the scope includes all possible combinations and uses of particular features described in the specification.

The systems and methods described integrate a vacuum distillation unit and a supercritical water process to upgrade an overflash stream from the vacuum distillation unit in the supercritical water process. Separating the overflash stream from the vacuum residue stream reduces the amount of vacuum residue stream and increases the conversion of hydrocarbons to lighter upgraded hydrocarbons. Advantageously, the integrated vacuum distillation unit and supercritical water process reduces the amount of heavy end fractions rejected as low value pitch or coke.

Advantageously and unexpectedly, the processes and systems described enable upgrading the overflash and reduce the amount processed in the vacuum residue fraction. Generally, the overflash is returned back to the flash zone or stripping zone of the vacuum distillation unit, but can be combined with the vacuum residue stream. The presence of the overflash stream is important to keep the wash zone in the vacuum distillation unit from being coked. In general, the flow rate of overflash is generally in the range of 2 to 30 volume percent (vol %) of atmospheric residue feed to the vacuum distillation unit. The actual flow rate of overflash depends on the crude type, vacuum distillation unit operating conditions, and desired boiling point ranges of vacuum gas oils. When blended with vacuum residue stream, the blended stream can be used for asphalt or as a feed to a residue conversion process such as a delayed coker or residue hydrocracker. While the overflash can be blended with the vacuum residue fraction, alone it is not suitable for processing by conventional catalytic processes such as hydrotreating, hydrocracking, and catalytic cracking due to high concentration of impurities, such as sulfur, nitrogen, and metals and high carbon residue (microcarbon residue, MCR), which shortens the life span of the catalyst and eventually deteriorates the performance of the processing unit. Advantageously and unexpectedly, the supercritical water systems described here enable treating the overflash such that it can be treated in a conventional upgrading unit.

Advantageously, the system and process to treat the overflash stream from the vacuum distillation unit improves bottom fraction upgrading. Advantageously, integrating a supercritical water process and a vacuum distillation unit enables recycle of water to the vacuum distillation unit as steam, which minimizes the amount of fresh steam added to the vacuum distillation unit. Advantageously and unexpectedly, recycling water from the supercritical water process to the vacuum distillation unit eliminates the requirement for oil-water separation tanks in the supercritical water process. Advantageously, the system and process to treat the overflash stream upgrades the overflash stream without need to separate any specific compounds. Advantageously, the system and process to treat the overflash stream decreases production of vacuum residue and increases production of upgraded products such as vacuum gas oil and diesel without the need for catalytic upgrading units to address high-metal and high-asphaltene fractions.

Advantageously and unexpectedly, separating the overflash stream from the vacuum residue improves the ability to utilize the overflash stream in supercritical water in bottom fraction upgrading. A stream containing vacuum residue and overflash fraction can plug process lines and produce coke precursors due to presence of asphaltenes before reaching high conversion in a supercritical water process. A stream containing only overflash is less difficult to process due to lower concentration of coke precursors and is less likely to plug process lines before reaching high conversion. Advantageously, supercritical water enables processing of the overflash stream that could not separately be processed in HCK/FCC due to fast deactivation of the catalyst due to higher asphalt and metal content than the HVGO.

The overflash stream has a reduced amount of asphaltene compared to the vacuum residue fraction. As a result, the overflash stream is easier to process with supercritical water and does not form coke as readily.

As used throughout, "overflash" or "slope wax" refers to the stream produced from the excess vaporization of the atmospheric residue feed in the flash zone of a vacuum distillation unit (VDU). The source of overflash can be understood with reference to FIG. 3, which shows a simplified scheme of a VDU. The atmospheric residue feed is heated by a vacuum furnace to a temperature of 380° C. to 425° C. Excessive heating or long residence time of feed atmospheric residue in the furnace causes coking in the transfer lines. The heated feed is injected to the flash zone in the VDU, which is under vacuum condition, for being vaporized. The flash zone is positioned on the upper side of the stripping zone. The vapors from the flash zone enter the wash zone, where certain structures, such as mesh or grid block, is installed. The liquid condensed in the wash zone flows down to the overflash collector tray located below the wash zone. This liquid collected on the overflash collector tray is the overflash. The overflash has properties between the heavy vacuum gas oil (HVGO) and vacuum residue. Because the overflash has been "once vaporized" it is lighter than vacuum residue and has less amount of impurities than vacuum residue.

As used throughout, "bottom fraction" refers to the fraction of an oil stream having a boiling point greater than 650 F, alternately greater than 1050 F, alternately greater than 1200 F, and alternately between 1050 F and 1200 F.

As used throughout, "external supply of hydrogen" refers to the addition of hydrogen to the feed to the reactor or to the reactor itself. For example, a reactor in the absence of an external supply of hydrogen means that the feed to the reactor and the reactor are in the absence of added hydrogen gas ($H_2$) or liquid, such that no hydrogen (in the form $H_2$) is a feed or a part of a feed to the reactor.

As used throughout, "external supply of catalyst" refers to the addition of catalyst to a feed to process or in a process unit. For example, a reactor in the absence of an external supply of catalyst means that the feed to the reactor and the reactor are in the absence of added catalyst not intrinsic to the hydrocarbon feed to the reactor.

As used throughout, "supercritical water" refers to water at a temperature at or greater than the critical temperature of water and at a pressure at or greater than the critical pressure of water. The critical temperature of water is 373.946° C. The critical pressure of water is 22.06 megapascals (MPa). It is known in the art that hydrocarbon reactions in supercritical water upgrade heavy oil and crude oil containing sulfur compounds to produce products that have lighter fractions. Supercritical water has unique properties making it suitable for use as a petroleum reaction medium where the reaction objectives can include conversion reactions, desulfurization reactions denitrogenation reactions, and demetallization reactions. Advantageously, at supercritical conditions water acts as both a hydrogen source and a solvent (diluent) in conversion reactions, desulfurization reactions and demetallization reactions and a catalyst is not needed. Hydrogen from the water molecules is transferred to the hydrocarbons through direct transfer or through indirect transfer, such as the water-gas shift reaction. In the water-gas shift reaction, carbon monoxide and water react to produce carbon dioxide and hydrogen. The hydrogen can be transferred to hydrocarbons in desulfurization reactions, demetallization reactions, denitrogenation reactions, and combinations.

As used throughout, "coke" refers to the toluene insoluble material present in petroleum.

As used throughout, "cracking" refers to the breaking of hydrocarbons into smaller ones containing few carbon atoms due to the breaking of carbon-carbon bonds.

As used throughout, "upgrade" or "upgrading" means one or all of increasing API gravity, decreasing the amount of heteroatoms, including sulfur atoms, nitrogen atoms, metal atoms, and oxygen atoms, decreasing the amount of asphaltene, increasing the middle distillate yield, decreasing the viscosity, and combinations of the same, in a process outlet stream relative to the process feed stream. One of skill in the art understands that upgrade can have a relative meaning such that a stream can be upgraded in comparison to another stream, but can still contain undesirable components such as heteroatoms.

As used throughout, "upgrading reactions" refers to reactions that can upgrade a hydrocarbon stream including cracking, isomerization, oligomerization, dealkylation, dimerization, aromatization, cyclization, desulfurization, denitrogenation, deasphalting, demetallization, and combinations of the same.

It is known in the art that hydrocarbon reactions in supercritical water upgrade heavy oil and crude oil containing sulfur compounds to produce products that have lighter fractions. Supercritical water has unique properties making it suitable for use as a petroleum reaction medium where the reaction objectives can include conversion reactions, desulfurization reactions denitrogenation reactions, and demetallization reactions. Supercritical water is water at a temperature at or greater than the critical temperature of water and at a pressure at or greater than the critical pressure of water. The critical temperature of water is 373.946° C. The critical pressure of water is 22.06 megapascals (MPa). Advantageously, at supercritical conditions water acts as both a hydrogen source and a solvent (diluent) in conversion reactions, desulfurization reactions and demetallization reactions and a catalyst is not needed. Hydrogen from the water molecules is transferred to the hydrocarbons through direct transfer or through indirect transfer, such as the water-gas shift reaction. In the water-gas shift reaction, carbon monoxide and water react to produce carbon dioxide and hydrogen. The hydrogen can be transferred to hydrocarbons in desulfurization reactions, demetallization reactions, denitrogenation reactions, and combinations of the same. The hydrogen can also reduce the olefin content. The production of an internal supply of hydrogen can reduce coke formation.

Without being bound to a particular theory, it is understood that the basic reaction mechanism of supercritical water mediated petroleum processes is the same as a free radical reaction mechanism. Radical reactions include initiation, propagation, and termination steps. With hydrocarbons, initiation is the most difficult step and conversion in supercritical water can be limited due to the high activation energy required for initiation. Initiation requires the breaking of chemical bonds. The bond energy of carbon-carbon bonds is about 350 kJ/mol, while the bond energy of carbon-hydrogen is about 420 kJ/mol. Due to the chemical bond energies, carbon-carbon bonds and carbon-hydrogen bonds do not break easily at the temperatures in a supercritical water process, 380° C. to 450° C., without catalyst or radical initiators. In contrast, aliphatic carbon-sulfur bonds have a bond energy of about 250 kJ/mol. The aliphatic carbon-sulfur bond, such as in thiols, sulfide, and disulfides, has a lower bond energy than the aromatic carbon-sulfur bond.

Thermal energy creates radicals through chemical bond breakage. Supercritical water creates a "cage effect" by surrounding the radicals. The radicals surrounded by water molecules cannot react easily with each other, and thus, intermolecular reactions that contribute to coke formation are suppressed. The cage effect suppresses coke formation by limiting inter-radical reactions. Supercritical water, having a low dielectric constant compared to liquid phase water, dissolves hydrocarbons and surrounds radicals to prevent the inter-radical reaction, which is the termination reaction resulting in condensation (dimerization or polymerization). Moreover, the dielectric constant of supercritical water can be tuned by adjusting the temperature and pressure. Because of the barrier set by the supercritical water cage, hydrocarbon radical transfer is more difficult in supercritical water as compared to conventional thermal cracking processes, such as delayed coker, where radicals travel freely without such barriers.

Figure 4A:
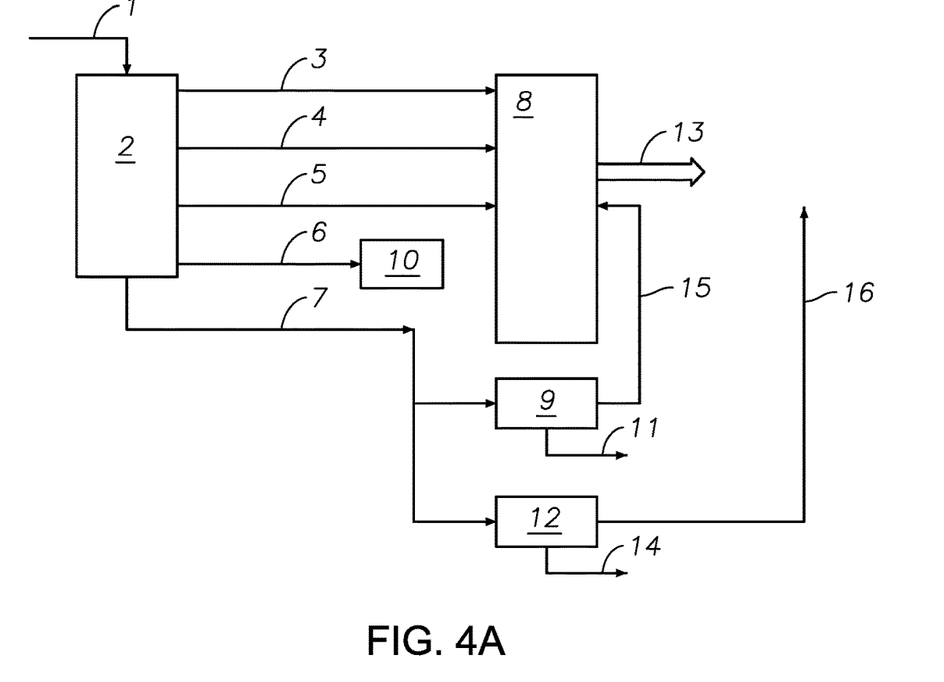
FIG. 4A provides a process diagram of an embodiment of the system and process for upgrading overflash stream from a vacuum distillation unit in a supercritical process.
Figure 4B:
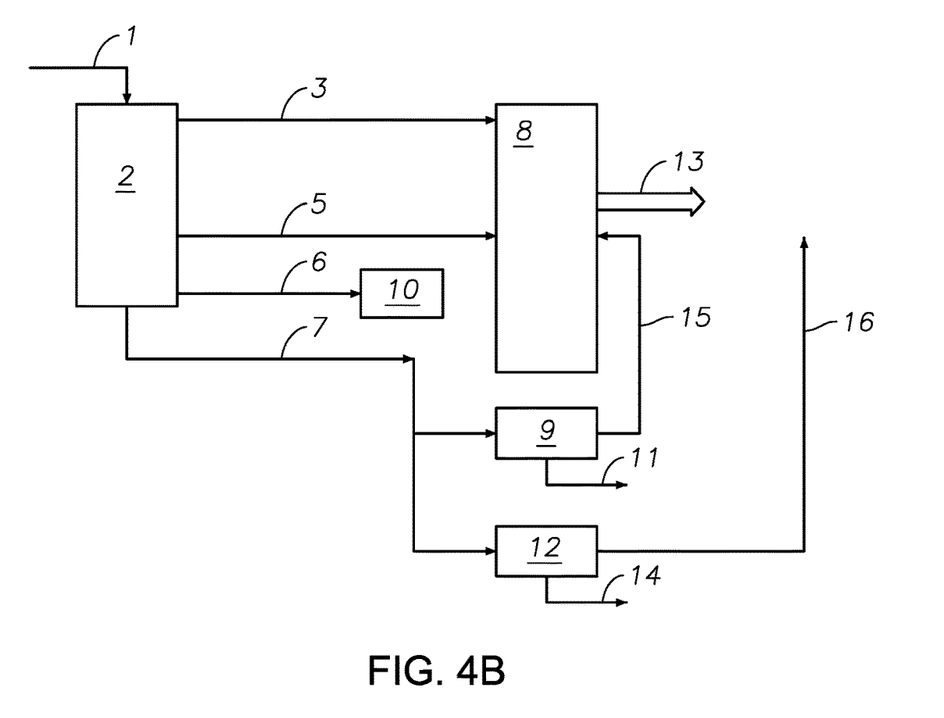
FIG. 4B provides a process diagram of an embodiment of the system and process for upgrading overflash stream from a vacuum distillation unit in a supercritical process.
Figure 4C:
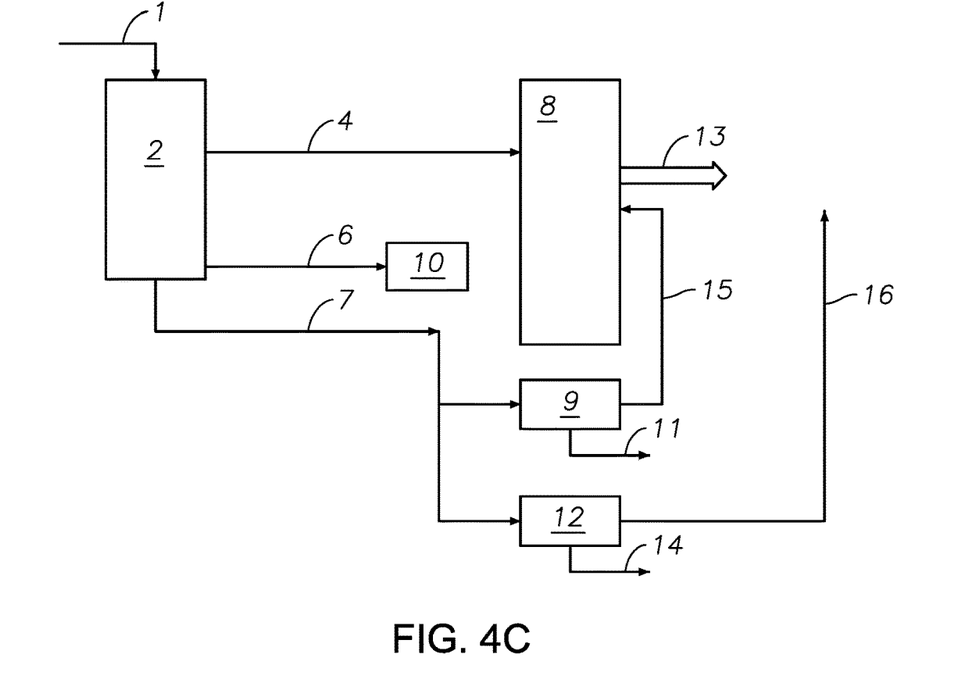
FIG. 4C provides a process diagram of an embodiment of the system and process for upgrading overflash stream from a vacuum distillation unit in a supercritical process.

Referring to FIGS. 4A-4C an embodiment of the system and process for treating an overflash stream as part of an integrated process for treating an atmospheric residue stream is provided.

Atmospheric residue stream 1 is introduced to vacuum distillation unit 2. Atmospheric residue stream 1 can be any atmospheric residue and can originate from a petroleum crude oil, a refining stream, a liquefied coal, a liquefied biomass, liquefied plastics, and combinations of the same. Atmospheric residue stream 1 can have a T5% greater than 250° C., alternately greater 300° C., alternately greater than 340° C., and alternately greater than 360° C. Atmospheric residue stream 1 can have an API gravity less than 25, alternately less than 20, alternately less than 16, and alternately less than 12. In at least one embodiment, atmospheric residue stream 1 has an API gravity of between 11 and 16. Atmospheric residue stream 1 has a total sulfur content greater than 0.5 percent by weight (wt %) sulfur, alternately greater than 1.0 wt %, and alternately greater than 1.5 wt %. In at least one embodiment, atmospheric residue stream 1 has a total sulfur content of between 2.5 wt % and 4.0 wt %. Atmospheric residue stream 1 has a $C_7$-asphaltene content of greater than 0.1 wt % and alternately greater than 0.5 wt %. In at least one embodiment, atmospheric residue stream 1 has a $C_7$-asphaltene content in the range between 2 wt % and 7 wt %. $C_7$-asphaltene is the n-heptane insoluble fraction as measured by ASTM D 3279 or equivalent methods. Atmospheric residue stream 1 has a Conradson Carbon Residue (CCR) greater than 0.2 wt % and alternately greater than 1 wt %. In at least one embodiment, atmospheric residue stream 1 has a CCR in the range of 5 wt % and 15 wt %. Atmospheric residue stream 1 has a 1050° F. or greater fraction as estimated by the true boiling point greater than 5 wt % and alternately in the range between 12 wt % and 60 wt %. In at least one embodiment, atmospheric residue stream 1 has an API gravity of between 11 and 16, a total sulfur content of between 2.5 wt % and 4.0 wt %, the $C_7$-asphaltene content in the range between 2 wt % and 7 wt %, a CCR in the range of 5 wt % and 15 wt %, and a true boiling point of 1050° F.+ fraction in the range between 12 wt % and 80 wt %.

Figure 3:
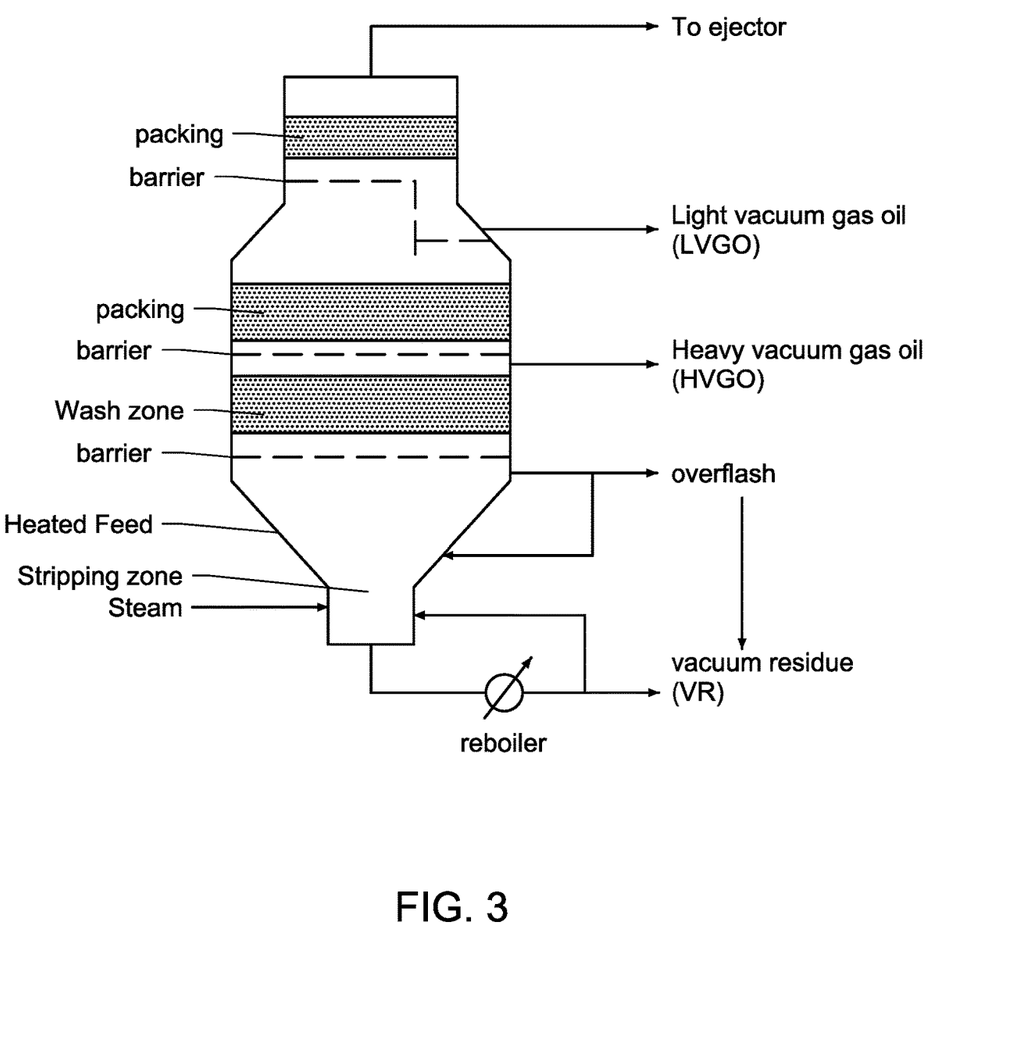
FIG. 3 provides a process diagram of a conventional vacuum distillation unit.

Vacuum distillation unit 2 can be any vacuum distillation unit, such as shown in FIG. 3. Vacuum distillation unit 2 can include an external supply of stripping steam. Stripping steam can be injected to the stripping zone, as shown in FIG. 3, to facilitate vaporization of hydrocarbons and preventing coke formation by reducing hydrocarbon concentration in the stripping zone. Steam can be injected in transfer line between furnace and distillation column to increase fluid velocity of the atmospheric residue stream. Alternately, in an embodiment as described with reference to FIG. 6A, FIG. 6B, FIG. 7, and FIG. 8, vacuum distillation unit 2 can be in the absence of an external supply of stripping steam with the water for steam provided from liquid phase product 120 or liquid recycle stream 152.

Returning to vacuum distillation unit 2, the pressure in the flash zone is between 10 mmHg to 40 mmHg absolute. The pressure in the overhead zone (top section) is between 5 mmHg and 15 mmHg absolute. The temperature in the flash zone is between 370° C. and 430° C. The temperature in the overhead zone is between 50° C. and 100° C. In the process and system of the instant claims, the cut points withdrawn from vacuum distillation unit 2 depend on the overall process requirements and the distillation conditions to achieve the desired cut points. In at least one embodiment, as shown in FIG. 4A, atmospheric residue stream 1 is treated in vacuum distillation unit 2 to produce light vacuum gas oil (LVGO) 3, middle vacuum gas oil (MVGO) 4, heavy vacuum gas oil (HVGO) 5, overflash (OF) stream 6, and vacuum residue 7 having the boiling point ranges shown in Table 1. Overflash stream 6 comprises the overflash fraction having the true boiling point ranges shown in Table 1.

TABLE 1

Boiling Point Ranges of an Embodiment of Vacuum Distillation Unit

|  | LVGO 3 | MVGO 4 | HVGO 5 | OF 6 | VR 7 |
| --- | --- | --- | --- | --- | --- |
| T10%, ° C. | 300-340 | 320-360 | 380-430 | 475-530 | 500-600 |
| T90%, ° C. | 380-420 | 400-450 | 450-500 | 600-700 | — |

In at least one embodiment, as shown in FIG. 4B, atmospheric residue stream 1 is treated in vacuum distillation unit 2 to produce light vacuum gas oil (LVGO) 3, heavy vacuum gas oil (HVGO) 5, overflash stream 6, and vacuum residue 7.

TABLE 2

Boiling Point Ranges of an Embodiment of Vacuum Distillation Unit

|  | LVGO 3 | MVGO 4 | OF 6 | VR 7 |
| --- | --- | --- | --- | --- |
| T10%, ° C. | 300-380 | 380-430 | 475-530 | 500-600 |
| T90%, ° C. | 430-450 | 450-500 | 600-700 | — |

In at least one embodiment, as shown in FIG. 4C, atmospheric residue stream 1 is treated in vacuum distillation unit 2 to produce vacuum gas oil (VGO) 17, overflash stream 6, and vacuum residue 7.

TABLE 3

Boiling Point Ranges of an Embodiment of Vacuum Distillation Unit

|  | VGO 17 | OF 6 | VR7 |
| --- | --- | --- | --- |
| T10%, ° C. | 300-380 | 475-530 | 500-600 |
| T90%, ° C. | 450-500 | 600-700 | — |

While the total streams and the cut point of streams removed from vacuum distillation unit 2 depend on the overall process requirement, the boiling points can be adjusted such that overflash stream 6 has a T10% in the range of 475° C. and 530° C. and a T90% in the range of 600° C. and 700° C. Overflash stream 6 has a mass flow rate in the range of 10% to 70% of vacuum residue 7.

LGVO 3, MVGO 4, HVGO 5, and VGO 15 are introduced to conversion process 8. Conversion process can be selected from a hydrocracking unit, hydrotreating unit, a fluid catalytic cracking unit, or combinations of the same. LGVO 3, MVGO 4, HVGO 5, VGO 15 can be processed in conversion process 8 to produce light hydrocarbons 13. Light hydrocarbons include olefins and distillates. A portion of vacuum residue 7 can be introduced to solvent deasphalting unit 9 to produce pitch 11 and deasphalted oil 15. A portion of vacuum residue 7 can be introduced to coker unit 12 to produce coke 14 and liquid coker product 16. Coker unit 12 can include a delayed coker. Liquid coker product 16 can be mixed with light hydrocarbons 13. Overflash stream 6 can be introduced to supercritical process 10.

Figure 5:
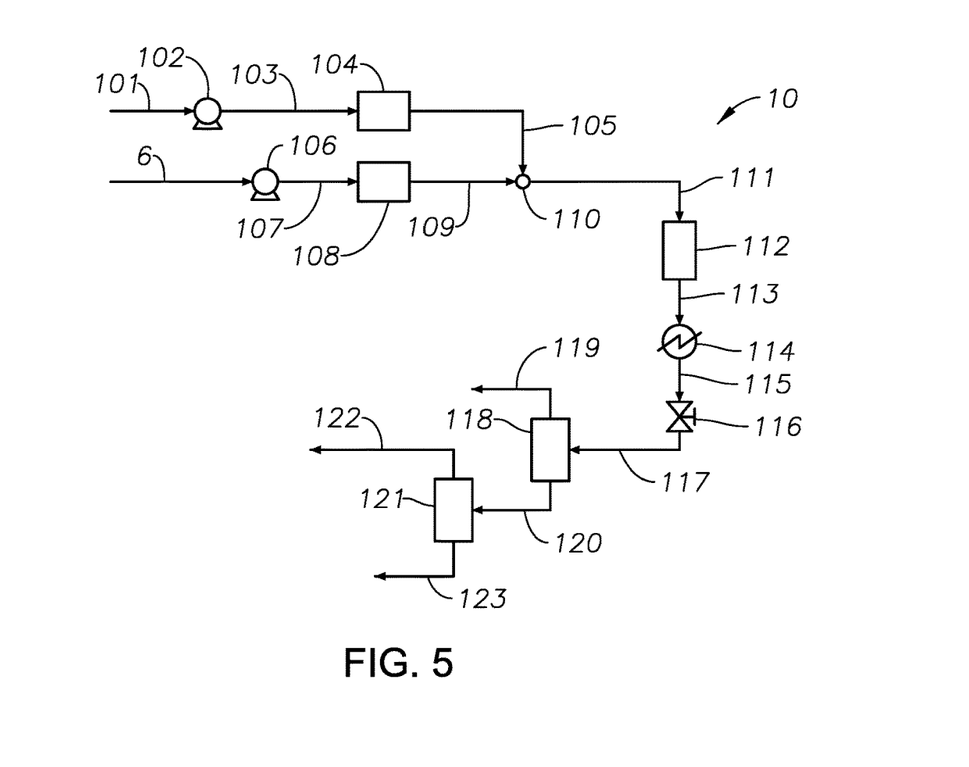
FIG. 5 provides a process diagram of an embodiment of the supercritical process to upgrade the overflash stream.

Referring to FIG. 5, an embodiment of supercritical process 10 is described. Water stream 101 can be any source of demineralized water having a conductivity less than 1 microSiemens (μS)/centimeter (cm), alternately less than 0.5 μS/cm, and alternately less than 0.1 μS/cm. Water stream 101 can be pressurized in water pump 102 to produce pressurized water stream 103. Water pump 102 can be any type of pump capable of increasing a pressure of a water stream. The pressure of pressurized water stream 103 can be in the range between 22 MPa and 35 MPa and alternately in the range between 23 MPa and 30 MPa. Pressurized water stream 103 can be introduced to water preheater 104.

The temperature of pressurized water stream 103 can be increased in water preheater 104 to produce supercritical water stream 105. Water preheater 104 can be any type of heat exchanger capable of increasing a temperature of a water stream. Examples of water preheater 104 can include a shell and tube heat exchanger, fired heater, electric heater, and combinations of the same. The temperature of supercritical water stream 105 can be in the range between 374° C. and 600° C., alternately between 400° C. and 600° C., and alternately between 450° C. and 550° C. Supercritical water stream 105 can be introduced to mixer 110.

The pressure of overflash stream 6 can be increased in oil pump 106 to produce pressurized overflash stream 107. Oil pump 106 can be any type of pump capable of pumping a heavy oil stream. The pressure of pressurized feed stream 107 can be between 22 MPa and 35 MPa, and alternately between 23 MPa and 30 MPa. Pressurized feed stream 107 can be introduced to oil preheater 108.

The temperature of pressurized overflash stream 107 can be reduced in precooler 108 to produce cooled overflash stream 109. Overflash stream 6 exits vacuum distillation unit 2 at temperatures greater than 350° C. Overflash stream 6 is cooled in precooler 108 to increase mixing of the hydrocarbons and supercritical water in reactor feed 111. Cooling overflash stream 6 to maintain a temperature gradient between the overflash stream and the supercritical water generates localized turbulence and contributes to mixing. Precooler 108 can be any type of heat exchanger capable of increasing a temperature of a heavy oil stream. Examples of precooler 108 include shell and tube heat exchangers, double pipe type heat exchangers, air coolers, and combinations of the same. The temperature of cooled overflash stream 109 can be in the range between 150° C. and 350° C. and alternately in the range between 200° C. and 300° C. Cooled overflash stream 109 can be introduced to mixer 110. In some embodiment, precooler 108 can be located before oil pump 106 (not shown).

The mass flow ratio of water stream 101 to overflash stream 6 can be in the range of 10:1 and 0.1:1 wt/wt at standard atmospheric temperature and pressure (SATP).

Supercritical water stream 105 and cooled overflash stream 109 can be mixed in mixer 110 to produce reactor feed 111. Mixer 110 can be any type of mixer capable of mixing a hot hydrocarbon stream and a supercritical water stream. Examples of mixer 110 include t-fitting mixer, y-fitting mixer, a line mixer, and combinations of the same. Reactor feed 111 can be introduced to supercritical reactor 112.

Supercritical reactor 112 can be any type of reactor capable of maintaining upgrading reactions in supercritical conditions. Supercritical reactor 112 can be one or more tubular reactors oriented horizontally, vertically, on an incline, on a decline, or as a combination of the same. In at least one embodiment, supercritical reactor 112 is a tubular reactor where fluid flows downward. Supercritical reactor 112 is in the absence of an external supply of hydrogen. Supercritical reactor 112 is in the absence of an external supply of catalyst. Supercritical reactor 112 is designed such that the superficial velocity of the internal fluid is sufficient to maintain turbulence, as estimated by Reynolds number. The Reynolds number of the internal fluid in supercritical reactor 112 is calculated by assuming the fluid has the density of water at the conditions of the supercritical reactor. Supercritical reactor 112 can be designed to have Reynolds number greater than 5,000 to avoid precipitation of hydrocarbons or insoluble solids in the reactor. The upper bound of Reynolds number is determined by pressure drop in supercritical reactor 112. Reynolds number increases as superficial velocity increases but so does pressure drop through the reactor and process lines. Pressure drop in supercritical reactor 112 is maintained between 0.1 and 2 MPa and alternately between 0.1 MPa and 0.5 MPa. Pressure drop greater than 2 MPa makes it more difficult to operate and control supercritical reactor 112. The residence time of internal fluid in supercritical reactor 112 is in the range of 0.5 minutes and 30 minutes and alternately in the range of 1 minute and 10 minutes. Residence time is calculated by assuming the internal fluid has the density of water at the reactor conditions. Supercritical reactor 112 does not need to be isothermal, but the temperature of the fluid in the terminal position of the reactor must be greater than the temperature of the fluid in the entry position of the reactor. The terminal position of the supercritical reactor is defined as the position between 90% to 100% of the entire length of the reactor. The entry position of the supercritical reactor is defined as the position between 0% to 5% of the entire length of the reactor. By way of example, if supercritical reactor 112 is 10 m in length, the terminal position is between 9 m and 10 m and the entry position is between 0 m and 0.5 m. Sufficient heat is supplied to supercritical reactor 112 to compensate for heat of reaction as well as heat loss. The temperature at the terminal position in supercritical reactor 112 can be between 380° C. and 500° C., and alternately between 420° C. and 460° C. The pressure in supercritical reactor 112 can be between 22 MPa and 30 MPa and alternately between 25 MPa and 30 MPa. In at least one embodiment, supercritical reactor 112 is at a temperature between 420° C. 460° C. and at a pressure between 25 MPa and 30 MPa.

Reactor effluent 113 can be introduced to cooling device 114. Cooling device 114 can be any type of unit that can reduce the temperature of a reactor effluent. Examples of cooling device 114 include a shell-and-tube type heat exchanger, a double pipe type heat exchanger, an air cooler, and combinations of the same. Examples of heat exchanger include a shell-and-tube type exchanger, a double-pipe type exchanger, and combinations of the same. In at least one embodiment, cooling device 114 is a double pipe type heat exchanger, which advantageously avoids precipitation of any fraction in the reactor effluent. The temperature of reactor effluent 113 can be reduced in cooling device 114 to produce cooled stream 115. The temperature of cooled effluent can be less than 374° C., alternately between 150° C. and 374° C., and alternately between 150° C. and 350° C. Cooled stream 115 can be introduced to depressurizing device 116. Reactor effluent 113 contains greater amounts of light fractions, less amounts of impurities, such as sulfur, nitrogen, oxygen, and metals, and less amount of $C_7$-asphaltenes compared to reactor feed 111.

Depressurizing device 116 can be any type of unit capable of reducing the pressure of a reactor effluent stream. Examples of depressurizing device 116 include a back pressure regulator, a multistage pressure regulator, a pressure control valve, and combinations of the same. In at least one embodiment, depressurizing device 116 is a back pressure regulator. The pressure of cooled stream 115 is reduced in depressurizing device 116 to produce discharged stream 117. The pressure of discharged stream 117 is between ambient pressure and 0.5 MPa. Discharged stream 117 can be introduced to gas-liquid separator 118.

Gas-liquid separator 118 can be any type of unit capable of separating an emulsion stream into a vapor stream and a liquid stream. Examples of gas-liquid separator 118 include a flash column, a gas-liquid separator, a liquid-liquid separator, and combinations of the same. Discharged stream 117 is separated in gas-liquid separator 118 to produce gas product 119 and liquid phase product 120. Liquid phase product 120 can be introduced to oil-water separator 121.

Oil-water separator 121 can be any type of unit capable of separating two liquids. Examples of oil-water separator include a liquid-liquid separator, a distillation column, and combinations of the same. Oil-water separator 121 separates liquid phase product 120 into liquid oil product 122 and water product 123. The conditions in oil-water separator 121 can be adjusted to adjust the amount of water in liquid oil product 122. The water content of liquid oil product 122 is less than 0.3 wt % and alternately less than 0.1 wt %.

Liquid oil product 122 contains upgraded hydrocarbons relative to overflash stream 6.

In an alternate embodiment, as described with reference to FIG. 6A and FIG. 6B, liquid phase product 120 can be recycled to vacuum distillation unit 2. The water in liquid phase product 120 can be used to provide the steam in vacuum distillation unit 2, such that an external source of steam is not required to be injected into the stripping zone.

In at least one embodiment, as described with reference to FIG. 6A, liquid phase product 120 is transferred by transfer pump 124 as recycle stream 125 to feed mixer 126. Feed mixer 126 can be any type of mixer capable of mixer two liquid streams. Examples of feed mixer include t-fitting mixer, y-fitting mixer, a line mixer, and combinations of the same. Feed mixer 126 mixes atmospheric residue stream 1 and recycle stream 125 to produce mixed feed 127. Mixed feed 127 is introduced to feed heater 128.

Feed heater 128 can increase the temperature of mixed feed 127 to produce heated feed 129. Feed heater 128 can be any type of heat exchanger capable of increasing the temperature of a hydrocarbon containing stream. Examples of the feed heater include a heat exchanger, electric heater, fired heater, and combinations of the same. Heated feed 129 can be at a temperature between 380° C. and 425° C. Heated feed 129 can be introduced to vacuum distillation unit 2.

In at least one embodiment, as described with reference to FIG. 6B, liquid phase product 120 is transferred by transfer pump 124 as recycle stream 125 to feed mixer 126. Feed mixer 126 can be any type of mixer capable of mixer two liquid streams. Examples of feed mixer include t-fitting mixer, y-fitting mixer, a line mixer, and combinations of the same. Feed mixer 126 mixes heated atmospheric residue 130 and recycle stream 125 to produce hot mixed feed 131. Hot mixed feed 131 is introduced to vacuum distillation unit 2. Hot mixed feed 131 can be at a temperature between 380° C. and 425° C. Hot mixed feed 131 can be introduced to vacuum distillation unit 2.

Advantageously, the water in liquid phase product can be recycled to vacuum distillation unit 2 in place of the external steam injected to the stripping zone for facilitating vaporization of hydrocarbons and preventing coke formation by reducing hydrocarbon concentration in the zone. The steam rate in vacuum distillation unit 2 is in the range of 2 to 100 kg-steam/m$^3$-vacuum residue and alternately in the range of 5 to 50 kg-steam/m$^3$-vacuum residue. Steam rate is defined as the ratio of kg of steam per hour and the m$^3$-vacuum residue. However, too much steam can cause issues in operation of the vacuum distillation unit. Issues in vacuum distillation unit 2 due to excess steam include the presence of free water phase in the condenser can cause corrosion, the vacuum ejector has to handle extra load, and an increased energy requirement for separation and treatment of condensed water.

When the amount of water in liquid phase product 120 is an amount such that the steam rate would be greater than 100 kg-steam/m$^3$-vacuum residue, then the volume of water in recycle stream 125 can be reduced. The amount of water in liquid phase product 120 can be calculated based on the amount of water in water stream 101 as required to meet reaction conditions in supercritical reactor 112.

Figure 7:
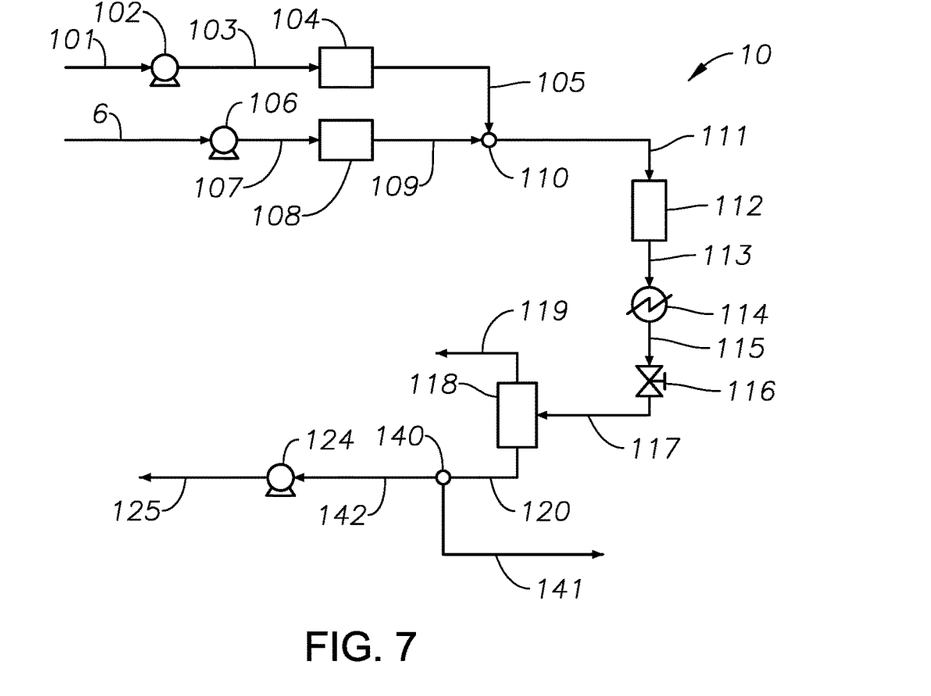
FIG. 7 provides a process diagram of an embodiment of the supercritical process to upgrade the overflash stream.

In at least one embodiment, water in recycle stream 125 can be reduced as described with reference to FIG. 7. Liquid phase product 120 is separated in splitter 140 to produce liquid phase stream 142 and liquid phase discharge 141. Liquid phase stream 142 can be transferred to vacuum distillation unit 2 through transfer pump 124 as described with reference to FIG. 6A and FIG. 6B. In at least one embodiment, liquid phase stream 142 can be mixed with atmospheric residue stream 1, heated and then introduced to the VDU. The flow rate of liquid phase stream 142 and liquid phase discharge 141 can be adjusted based on the amount of water in liquid phase product 120 and the flow rate of atmospheric residue stream 1.

Figure 8:
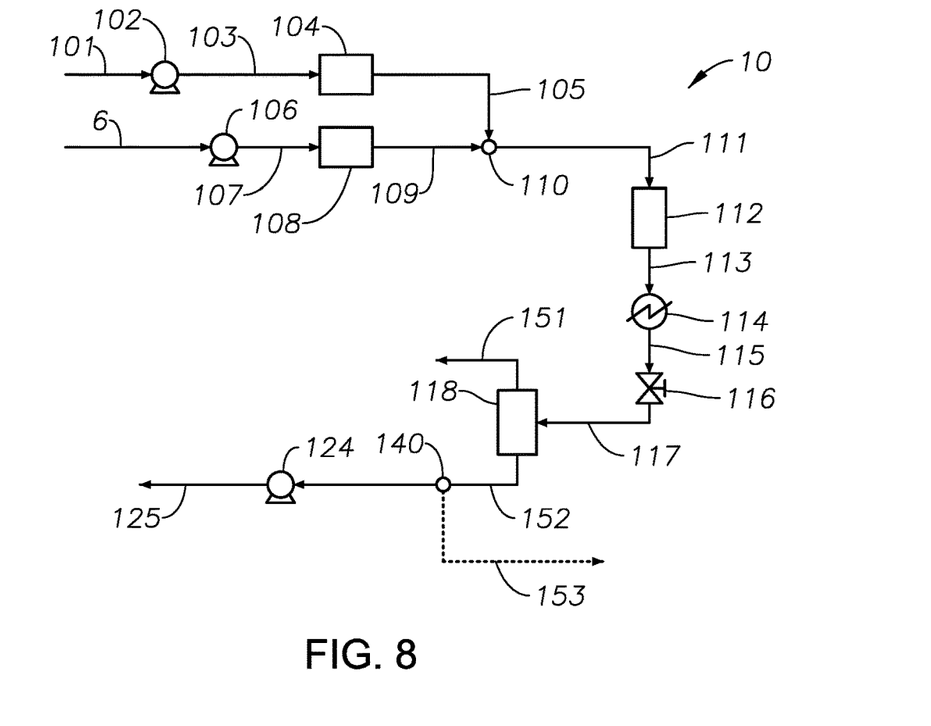
FIG. 8 provides a process diagram of an embodiment of the supercritical process to upgrade the overflash stream.

In at least one embodiment, water in recycle stream 125 can be reduced as described with reference to FIG. 8. Gas-liquid separator 118 is a flash column and conditions are adjusted such that greater than 50 wt % of the amount of water in discharged stream 117 is separated as part of vapor product 151. The temperature in the flash column of gas-liquid separator 118 can be between 120° C. and 300° C. A heater can be used to maintain the internal temperature of gas-liquid separator 118 in that range. The heater can be installed on the feed line to gas-liquid separator 118, can be located external to gas-liquid separator, or positioned internal to gas-liquid separator. The pressure in gas-liquid separator 118 when gas-liquid separator 118 is a flash column can be in the range between 0.1 barg and 20 barg. The pressure in gas-liquid separator 118 can be controlled by a pressure control device located on the vapor product line. The pressure is selected to be equal to or less than the steam saturation pressure at the temperature in gas-liquid separator 118. Vapor product 151 can be cooled to condense the liquid oil and water to recover light fractions of product oil. Liquid recycle stream 152 contains less water and greater amount of heavy ends compared to liquid phase product 120. Liquid recycle stream 152 can be recycled through transfer pump 125. Optionally, liquid recycle stream 152 can be split in splitter 140 to produce split stream 153.

EXAMPLES

Figure 6A:
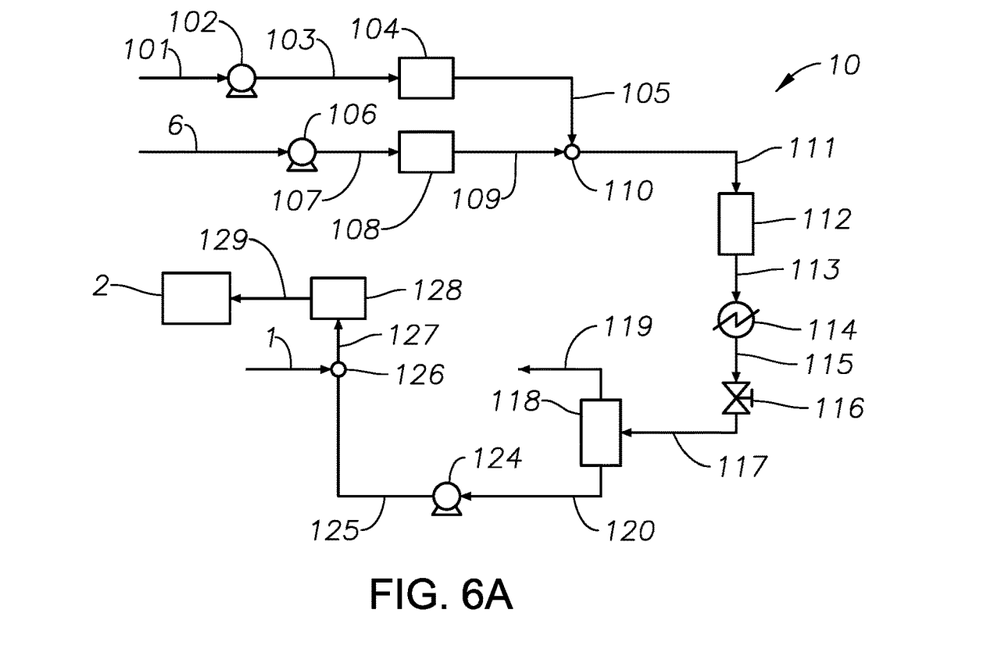
FIG. 6A provides a process diagram of an embodiment of the supercritical process to upgrade the overflash stream.
Figure 6B:
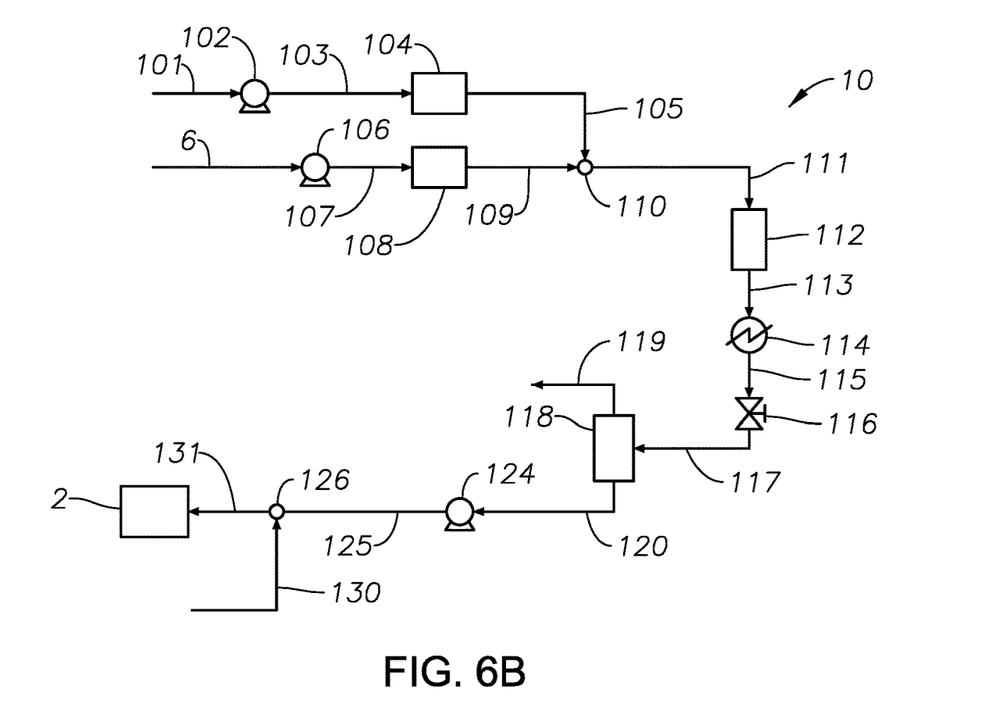
FIG. 6B provides a process diagram of an embodiment of the supercritical process to upgrade the overflash stream.

Example 1 was modeled on FIG. 6A. Atmospheric residue stream 1 had a temperature of 418° C. Vacuum distillation unit 2 had a pressure of 27 mmHg in the flash zone and a pressure of 49 mmHg in the stripping zone. There was no external supply of stripping steam. The properties of atmospheric residue stream 1 and the product streams are shown in Table 4.

TABLE 4

Properties of Feed and Product from Vacuum Distillation Unit

| Property | Unit | Atmospheric Residue 1 | LVGO 3 | MVGO 4 | HVGO 5 | Overflash Stream 6 | Vacuum Residue 7 |
|---|---|---|---|---|---|---|---|
| Mass Flow | kg/h | 138733 | 10064 | 39900 | 20383 | 14933 | 53453 |
| Sulfur Content | wt% sulfur | 4.74 | 2.34 | 2.80 | 2.95 | 3.65 | 4.15 |
| Specific Gravity (API) | | 16.3 | 25.8 | 21.0 | 17.7 | 11.6 | 4.9 |
| Distillation (ASTM D7169) | | | | | | | |
| 5% | ° C. | 383 | 313 | 376 | 457 | 476 | 523 |
| 10% | ° C. | 406 | 325 | 387 | 472 | 500 | 546 |
| 30% | ° C. | 480 | 336 | 419 | 496 | 539 | 593 |
| 50% | ° C. | 534 | 349 | 437 | 509 | 568 | 619 |
| 70% | ° C. | 601 | 361 | 461 | 531 | 597 | 659 |

TABLE 4-continued

Properties of Feed and Product from Vacuum Distillation Unit

| Property | Unit | Atmospheric Residue 1 | LVGO 3 | MVGO 4 | HVGO 5 | Overflash Stream 6 | Vacuum Residue 7 |
|---|---|---|---|---|---|---|---|
| 90% | ° C. | 678 | 392 | 494 | 554 | 635 | 705 |
| 95% | ° C. | 710 | 406 | 502 | 556 | 672 | 723 |

In supercritical process 10, water stream 101 was a demineralized water having a conductivity of about 0.1 µS/cm. The mass ratio of water stream 101 to overflash stream 6 is 1.32 wt/wt at standard atmospheric temperature and pressure (SATP). Supercritical reactor 112 was a tubular type reactor and the residence time was 2.9 minutes. Gas-liquid separator 118 was a flash column to produce vapor product 151 and liquid recycle stream 152. The stream properties in supercritical process 10 are shown in Table 5.

TABLE 5

Stream properties in supercritical process 10

| | Temperature (° C.) | Pressure (barg) | Mass Flow (kg/h) |
|---|---|---|---|
| Water Stream 101 | 30 | 1 | 19712 |
| Pressurized Water Stream 103 | 32 | 270 | 19712 |
| Pressurized Overflash Stream 107 | 250 | 15 | 14933 |
| Supercritical Water Stream 105 | 480 | 270 | 19712 |
| Cooled Overflash 109 | 255 | 270 | 14933 |
| Reactor Feed 111 | 439 | 270 | 34645 |
| Reactor Effluent 113 | 450 | 270 | 34645 |
| Cooled Stream 115 | 318 | 270 | 34645 |
| Discharged Stream 117 | 192 | 12 | 34645 |
| Vapor Product 151 | 191 | 12 | 19524 |
| Liquid Recycle Stream 152 | 191 | 12 | 15122 |

The composition of vapor product 151 and liquid recycle stream 152 are shown in Table 6. The Light gases in vapor product include hydrogen, carbon dioxide, methane, ethane, ethylene, propane, propylene, butanes, butane, and combinations of the same.

TABLE 6

Composition of Vapor Product and Liquid Recycle Stream

| | Vapor Product 151 | Liquid Recycle Stream 152 |
|---|---|---|
| Total Flow Rate (kg/h) | 19524 | 15122 |
| Amount Light Gases (kg/h) | 382 | — |
| Amount Oil (kg/h) | 1408 | 13143 |
| Amount of Water (kg/h) | 17734 | 1978 |

The oil in vapor product 151 and liquid recycle stream 152 have the properties shown in Table 7.

TABLE 7

Properties of oil in vapor product and liquid phase

| | | Oil in Vapor Product 151 | Oil in Liquid Recycle Stream 152 |
|---|---|---|---|
| Sulfur Content | wt % sulfur | 1.7 | 2.8 |
| Specific Gravity | API | 44 | 13 |
| Distillation | | | |
| TBP 5% | ° C. | 67 | 284 |
| TBP 10% | ° C. | 69 | 335 |
| TBP 30% | ° C. | 136 | 438 |

TABLE 7-continued

Properties of oil in vapor product and liquid phase

| | | Oil in Vapor Product 151 | Oil in Liquid Recycle Stream 152 |
|---|---|---|---|
| TBP 50% | ° C. | 171 | 490 |
| TBP 70% | ° C. | 198 | 546 |
| TBP 90% | ° C. | 262 | 636 |
| TBP 95% | ° C. | 303 | 670 |

The results show that treating the overflash in supercritical water reduces vacuum residue product, thus reduces the amount of the low-value stream. In liquid recycle stream 152, the bottom fraction, the 1050 F+ fraction, was about 2 wt %. In the feed overflash stream, the 1050 F+ was 56 wt %. Supercritical water converts 52% of the 1050 F+ fraction in lighter fractions. The process does not require oil-water separation tanks and steam injection to the vacuum distillation unit is not required.

Example 2

Example 2 was a comparative example based on Example 1. In Example 2, the overflash stream was not separated into a separate stream. Without separating the overflash stream into a separate stream, it is discharged with the vacuum residue fraction. The total amount of vacuum residue increases from 53453 kg/hr to 68386 kg/hr. By incorporating overflash fraction, the vacuum residue fraction becomes lighter, an increased API gravity and the TBP curve is shifted to lower temperatures, as shown in Table 8.

TABLE 8

Comparison of Vacuum Residue Example 1 to Example 2.

| Property | Unit | Vacuum Residue 7 (Example 1) | Vacuum Residue (Example 2) |
|---|---|---|---|
| Mass Flow | kg/h | 53453 | 68386 |
| Sulfur Content | wt % sulfur | 4.15 | 4.04 |
| Specific Gravity (API) | | 4.9 | 6.39 |
| CCR | Wt % | 23 | 20 |
| 5% | ° C. | 523 | 520 |
| 10% | ° C. | 546 | 530 |
| 30% | ° C. | 593 | 579 |
| 50% | ° C. | 619 | 603 |
| 70% | ° C. | 659 | 634 |
| 90% | ° C. | 705 | 693 |
| 95% | ° C. | 723 | 716 |

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

There various elements described can be used in combination with all other elements described here unless otherwise indicated.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed here as from about one particular value to about another particular value and are inclusive unless otherwise indicated. When such a range is expressed, it is to be understood that another embodiment is from the one particular value to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these references contradict the statements made here.

As used here and in the appended claims, the words "comprise," "has," and "include" and all grammatical variations thereof are each intended to have an open, non-limiting meaning that does not exclude additional elements or steps.

That which is claimed:

1. A method of upgrading an overflash stream from a vacuum distillation unit, the method comprising the steps of:
    separating the overflash stream from an atmospheric residue stream in the vacuum distillation unit, wherein the overflash stream comprises an overflash fraction having a T10% between 475 and 530° C. and a T90% between 600 and 700° C.;
    increasing a pressure of an overflash stream in an oil pump to produce a pressurized overflash stream;
    reducing a temperature of the pressurized overflash stream in a precooler to produce a cooled overflash stream, wherein the temperature of cooled overflash stream is in the range between 150° C. and 350° C.;
    increasing a pressure of a water stream in a water pump to produce a pressurized water stream;
    increasing a temperature of the pressurized water stream in a water preheater to produce a supercritical water stream, wherein a pressure of the supercritical water stream is between 23 MPa and 30 MPa and a temperature of the supercritical water stream is between 400° C. and 600° C.;
    mixing the supercritical water stream and the cooled overflash stream in a mixer to produce a reactor feed;
    introducing the reactor feed to a supercritical reactor, wherein the supercritical reactor is in the absence of an external supply of hydrogen, wherein the supercritical reactor is in the absence of an external supply of catalyst, wherein the supercritical reactor is at a temperature between 380° C. and 500° C. and a pressure between 25 MPa and 30 MPa;
    maintaining upgrading reactions in the supercritical reactor to upgrade the overflash fraction in the reactor feed, such that a reactor effluent produced by the supercritical reactor comprises upgraded hydrocarbons relative to the hydrocarbons in the overflash fraction;
    reducing a temperature of a reactor effluent in a cooling device to produce a cooled stream;
    reducing a pressure of the cooled stream in a depressurizing device to produce a discharged stream; and
    separating the discharged stream in a gas-liquid separator to produce a gas product and a liquid phase product.

2. The method of claim 1 further comprising the steps of:
    transferring the liquid phase product in a transfer pump to produce a recycle stream;
    mixing the recycle stream and the atmospheric residue stream in a feed mixer to produce a mixed feed;
    increasing a temperature of the mixed feed in a feed heater to produce a heated feed; and
    introducing the heated feed to the vacuum distillation unit, wherein water in the liquid phase product provides stripping steam in the vacuum distillation unit.

3. The method of claim 1 further comprising the steps of:
    transferring the liquid phase product in a transfer pump to produce a recycle stream; and
    mixing the recycle stream and a heated atmospheric residue in a feed mixer to produce a hot mixed feed, wherein water in the liquid phase product provides stripping steam in the vacuum distillation unit.

4. The method of claim 1 further comprising the steps of:
    splitting the liquid phase product into a liquid phase stream and a liquid phase discharge; and
    transferring the liquid phase stream in a transfer pump to produce a recycle stream.

5. The method of claim 1, wherein the gas-liquid separator is a flash column and the method further comprises the steps of:
    separating the discharged stream in the flash column to produce a vapor product and a liquid recycle stream, wherein a temperature in the flash column is between 120° C. and 300° C. and a pressure is between 0.1 barg and 20 barg such that the pressure is selected to be equal to or less than the steam saturation pressure at the temperature in the flash column, wherein the vapor product comprises greater than 50 wt % of the amount of water in the discharged stream; and
    transferring the liquid recycle stream in a transfer pump to produce a recycle stream.

6. The method of claim 1, wherein a mass flow ratio of the water stream to the overflash stream is in the range of 10:1 and 0.1:1 wt/wt at SATP.

7. The method of claim 1, wherein the supercritical reactor comprises one or more tubular reactors oriented horizontally, vertically, on an incline, on a decline, or as a combination of the same.

8. The method of claim 1, wherein a residence time in the supercritical reactor 142 is in the range of 0.5 minutes and 30 minutes.

9. The method of claim 1, wherein a Reynolds number of the internal fluid in supercritical reactor is greater than 5,000.

10. The method of claim 1, wherein a temperature of the cooled stream is between 150° C. and 350° C.

11. The method of claim 1, wherein a pressure of the discharged stream is between ambient pressure and 0.5 MPa.

12. The method of claim 1 further comprising the step of separating the liquid phase product in an oil-water separator to produce a liquid oil product and a water product.

13. A system to upgrade an overflash stream from a vacuum distillation unit, the system comprising:
    the vacuum distillation unit configured to separate the overflash stream from an atmospheric residue stream, wherein the overflash stream comprises an overflash fraction having a T10% between 475 and 530° C. and a T90% between 600 and 700° C.;
    an oil pump fluidly connected to the vacuum distillation unit, the oil pump configured to increase a pressure of the overflash stream produce a pressurized overflash stream;

a precooler fluidly connected to the oil pump, the precooler configured to reduce a temperature of the pressurized overflash stream to produce a cooled overflash stream;
a water pump configured to increase a pressure of a water stream to produce a pressurized water stream;
a water preheater fluidly connected to the water pump, the water preheater configured to reduce a temperature of the pressurized water stream to produce a supercritical water stream;
a mixer fluidly connected to the precooler and the water preheater, the mixer configured to mix the supercritical water stream and the cooled overflash stream to produce a reactor feed;
a supercritical reactor fluidly connected to the mixer, the supercritical reactor configured to maintain upgrading reactions to upgrade the overflash fraction in the reactor feed to produce a reactor effluent, wherein the supercritical reactor is in the absence of an external supply of hydrogen, wherein the supercritical reactor is in the absence of an external supply of catalyst, wherein the supercritical reactor is at a temperature between 380° C. and 500° C. and a pressure between 25 MPa and 30 MPa;
a cooling device fluidly connected to the supercritical reactor, the cooling device configured to reduce a temperature of the reactor effluent to produce a cooled stream;
a depressurizing device fluidly connected to the cooling device, the depressurizing device configured to reduce a pressure of the cooled stream to produce a discharged stream;
a gas-liquid separator fluidly connected to the depressurizing device, the gas-liquid separator configured to separate the discharged stream to produce a gas product and a liquid phase product;
a transfer pump fluidly connected to the gas-liquid separator, the transfer pump configured to transfer the liquid phase product to produce a recycle stream;
a feed mixer fluidly connected to the transfer pump, the feed mixer configured to mix the recycle stream and the atmospheric residue stream to produce a mixed feed; and
a feed heater fluidly connected to the feed mixer, the feed heater configured to increase a temperature of the mixed feed to produce a heated feed, wherein the heated feed is introduced the vacuum distillation unit.

14. The system of claim 13, wherein the gas-liquid separator is a flash column, wherein a temperature in the flash column is between 120° C. and 300° C. and a pressure is between 0.1 barg and 20 barg such that the pressure is selected to be equal to or less than the steam saturation pressure at the temperature in the flash column, wherein the vapor product comprises greater than 50 wt % of the amount of water in the discharged stream.

15. The system of claim 13, wherein the supercritical reactor comprises one or more tubular reactors oriented horizontally, vertically, on an incline, on a decline, or as a combination of the same.

16. The system of claim 13, wherein a Reynolds number of the internal fluid in supercritical reactor is greater than 5,000.

17. A system to upgrade an overflash stream from a vacuum distillation unit, the system comprising:
the vacuum distillation unit configured to separate the overflash stream from an atmospheric residue stream, wherein the overflash stream comprises an overflash fraction having a T10% between 475 and 530° C. and a T90% between 600 and 700° C.;
an oil pump fluidly connected to the vacuum distillation unit, the oil pump configured to increase a pressure of the overflash stream produce a pressurized overflash stream;
a precooler fluidly connected to the oil pump, the precooler configured to reduce a temperature of the pressurized overflash stream to produce a cooled overflash stream;
a water pump configured to increase a pressure of a water stream to produce a pressurized water stream;
a water preheater fluidly connected to the water pump, the water preheater configured to reduce a temperature of the pressurized water stream to produce a supercritical water stream;
a mixer fluidly connected to the precooler and the water preheater, the mixer configured to mix the supercritical water stream and the cooled overflash stream to produce a reactor feed;
a supercritical reactor fluidly connected to the mixer, the supercritical reactor configured to maintain upgrading reactions to upgrade the overflash fraction in the reactor feed to produce a reactor effluent, wherein the supercritical reactor is in the absence of an external supply of hydrogen, wherein the supercritical reactor is in the absence of an external supply of catalyst, wherein the supercritical reactor is at a temperature between 380° C. and 500° C. and a pressure between 25 MPa and 30 MPa;
a cooling device fluidly connected to the supercritical reactor, the cooling device configured to reduce a temperature of the reactor effluent to produce a cooled stream;
a depressurizing device fluidly connected to the cooling device, the depressurizing device configured to reduce a pressure of the cooled stream to produce a discharged stream;
a gas-liquid separator fluidly connected to the depressurizing device, the gas-liquid separator configured to separate the discharged stream to produce a gas product and a liquid phase product; and
an oil-water separator fluidly connected to the gas-liquid separator, the oil-water separator configured to separate the liquid phase product to produce a liquid oil product and a water product.

18. A system to upgrade an overflash stream from a vacuum distillation unit, the system comprising:
the vacuum distillation unit configured to separate the overflash stream from an atmospheric residue stream, wherein the overflash stream comprises an overflash fraction having a T10% between 475 and 530° C. and a T90% between 600 and 700° C.;
an oil pump fluidly connected to the vacuum distillation unit, the oil pump configured to increase a pressure of the overflash stream produce a pressurized overflash stream;
a precooler fluidly connected to the oil pump, the precooler configured to reduce a temperature of the pressurized overflash stream to produce a cooled overflash stream;
a water pump configured to increase a pressure of a water stream to produce a pressurized water stream;
a water preheater fluidly connected to the water pump, the water preheater configured to reduce a temperature of the pressurized water stream to produce a supercritical water stream;

a mixer fluidly connected to the precooler and the water preheater, the mixer configured to mix the supercritical water stream and the cooled overflash stream to produce a reactor feed;

a supercritical reactor fluidly connected to the mixer, the supercritical reactor configured to maintain upgrading reactions to upgrade the overflash fraction in the reactor feed to produce a reactor effluent, wherein the supercritical reactor is in the absence of an external supply of hydrogen, wherein the supercritical reactor is in the absence of an external supply of catalyst, wherein the supercritical reactor is at a temperature between 380° C. and 500° C. and a pressure between 25 MPa and 30 MPa;

a cooling device fluidly connected to the supercritical reactor, the cooling device configured to reduce a temperature of the reactor effluent to produce a cooled stream;

a depressurizing device fluidly connected to the cooling device, the depressurizing device configured to reduce a pressure of the cooled stream to produce a discharged stream;

a gas-liquid separator fluidly connected to the depressurizing device, the gas-liquid separator configured to separate the discharged stream to produce a gas product and a liquid phase product;

a transfer pump fluidly connected to the gas-liquid separator, the transfer pump configured to transfer the liquid phase product to produce a recycle stream; and a feed mixer fluidly connected to the transfer pump, the feed mixer configured to mix the recycle stream and a heated atmospheric residue to produce a hot mixed feed, wherein water in the liquid phase product provides stripping steam in the vacuum distillation unit.

* * * * *

UNITED STATES PATENT AND TRADEMARK OFFICE
CERTIFICATE OF CORRECTION

| | | |
|---|---|---|
| PATENT NO. | : 11,578,273 B1 | Page 1 of 1 |
| APPLICATION NO. | : 17/671776 | |
| DATED | : February 14, 2023 | |
| INVENTOR(S) | : Choi et al. | |

It is certified that error appears in the above-identified patent and that said Letters Patent is hereby corrected as shown below:

In the Claims

Column 18, Claim 8, Line 45 should read:
-- supercritical reactor is in the range of 0.5 minutes and --

Signed and Sealed this
Twenty-first Day of March, 2023

*Katherine Kelly Vidal*

Katherine Kelly Vidal
*Director of the United States Patent and Trademark Office*